(12) United States Patent
Bellato et al.

(10) Patent No.: US 7,823,558 B2
(45) Date of Patent: Nov. 2, 2010

(54) TUMBLE SYSTEM FOR THE INTAKE MANIFOLD OF AN INTERNAL-COMBUSTION ENGINE PROVIDED WITH AN ACTUATOR MADE WITH SHAPE-MEMORY MATERIAL

(75) Inventors: Nazario Bellato, Bologna (IT); Federico Lancioni, Sangemini (IT); Michele Pecora, Potenza (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 908 days.

(21) Appl. No.: 11/432,726

(22) Filed: May 11, 2006

(65) Prior Publication Data
US 2006/0272613 A1    Dec. 7, 2006

(30) Foreign Application Priority Data
May 11, 2005    (EP)    ................................ 05425310

(51) Int. Cl.
*F02B 31/04*    (2006.01)
*F02B 31/06*    (2006.01)

(52) U.S. Cl. ...................... 123/306; 123/337
(58) Field of Classification Search .................. 123/302, 123/306, 308, 336, 337, 184.53
See application file for complete search history.

(56) References Cited

U.S. PATENT DOCUMENTS

| | | | | |
|---|---|---|---|---|
| 4,207,854 A | * | 6/1980 | Alford et al. | 123/188.14 |
| 4,577,602 A | * | 3/1986 | Showalter | 123/306 |
| 4,858,567 A | * | 8/1989 | Knapp | 123/184.56 |
| 4,884,780 A | | 12/1989 | Ohashi et al. | |
| 4,887,430 A | * | 12/1989 | Kroll et al. | 60/527 |
| 5,396,769 A | * | 3/1995 | Brudnicki | 60/527 |
| 5,417,367 A | | 5/1995 | Baclet et al. | |
| 6,827,060 B2 | * | 12/2004 | Huh | 123/336 |
| 7,089,909 B2 | * | 8/2006 | Moschini et al. | 123/306 |
| 7,188,604 B2 | * | 3/2007 | Isaji et al. | 123/337 |
| 7,409,944 B2 | * | 8/2008 | Tsuchiya | 123/337 |
| 7,455,043 B2 | * | 11/2008 | Lancioni et al. | 123/306 |
| 2004/0068985 A1 | | 4/2004 | Morten et al. | |

FOREIGN PATENT DOCUMENTS

| | | |
|---|---|---|
| EP | 0 343 515 A | 11/1989 |
| GB | 2 313 625 A | 12/1997 |

OTHER PUBLICATIONS

European Search Report for EP 05 42 5310 dated Sep. 20, 2005.

* cited by examiner

*Primary Examiner*—Stephen K Cronin
*Assistant Examiner*—Arnold Castro
(74) *Attorney, Agent, or Firm*—Bryan A. Santarelli; Graybeal Jackson LLP (57) ABSTRACT

A tumble system for the intake manifold of an internal-combustion engine is provided with a number of cylinders. The tumble system is provided with at least one throttle valve for varying the section of passage of air through an intake pipe, which connects a cylinder with the intake manifold. The throttle valve has a throttle butterfly mounted so as to rotate under the thrust of an actuator device equipped with at least one actuator element, which is made of a shape-memory material that generates a torque by modifying its own geometry following upon application of an external stress of a physical nature.

44 Claims, 6 Drawing Sheets

TUMBLE SYSTEM FOR THE INTAKE MANIFOLD OF AN INTERNAL-COMBUSTION ENGINE PROVIDED WITH AN ACTUATOR MADE WITH SHAPE-MEMORY MATERIAL

PRIORITY CLAIM

This application claims priority from European patent application No. 05425310.9, filed May 11, 2005, which is incorporated herein by reference.

TECHNICAL FIELD

The present invention relates to a tumble system for the intake manifold of an internal-combustion engine.

BACKGROUND

An internal-combustion engine is provided with a number of cylinders, each of which is connected to an intake manifold via at least one intake valve and to an exhaust manifold via at least one exhaust valve. The intake manifold receives fresh air (i.e., air coming from the external environment) through a supply pipe regulated by a throttle valve and is connected to the cylinders by means of respective intake pipes, each of which is regulated by at least one intake valve.

Recently, there has been proposed the introduction of a tumble system, which is designed to vary the cross section of the intake pipes according to the r.p.m. of the engine itself (i.e., of the angular velocity of rotation of the engine crankshaft). At low r.p.m., the section of passage of the air through the intake pipes is reduced so as to generate turbulence in the flow of intake air and at a point corresponding to the variation in section, which improves mixing between the air and the fuel in the cylinders. In particular, thanks to the presence of this turbulence, which improves mixing, all the injected fuel is burnt, and hence the pollutant emissions generated by combustion are reduced. At high r.p.m., the section of passage of the air through the intake pipes is maximized so as to enable a complete filling of the cylinders and thus enable generation of the maximum power possible.

To vary the section of passage of the air through the intake pipes it has been proposed to provide, within each intake pipe, a throttling body, which is fitted on a common shaft so as to turn between a working position, in which the throttling body reduces the section of the intake pipe, and a resting position, in which the throttling body does not reduce the section of the intake pipe. The common shaft is turned by an actuator, which is designed to control in a simultaneous and synchronous way the position of all the throttling bodies.

In engines currently available on the market, the actuator of the tumble system responsible for controlling the throttling bodies comprises an electric motor having a rotor mechanically connected to the common shaft. However, said arrangement involves a relatively heavy weight, is relatively cumbersome (also on account of the presence of the electronics for driving the electric motor), and presents an acceptable, but not particularly high, level of reliability (in particular, said solution is subject to malfunctioning of the electronics for driving the electric motor). In engines currently available on the market, it has also been proposed to use a pneumatic actuator for driving the common shaft. However, also this arrangement has a relatively heavy weight and above all considerable overall dimensions.

SUMMARY

An aim of an embodiment of the present invention is to provide a tumble system for the intake manifold of an internal-combustion engine that will be free from of the drawbacks described above and, in particular, will be easy and economically advantageous to produce.

According to the present invention, a tumble system for the intake manifold of an internal-combustion engine is provided according to the attached claims.

BRIEF DESCRIPTION OF THE DRAWINGS

The present invention will now be described with reference to the annexed plate of drawings, which illustrate some non-limiting examples of embodiment thereof, and in which.

DETAILED DESCRIPTION

Figure 1:
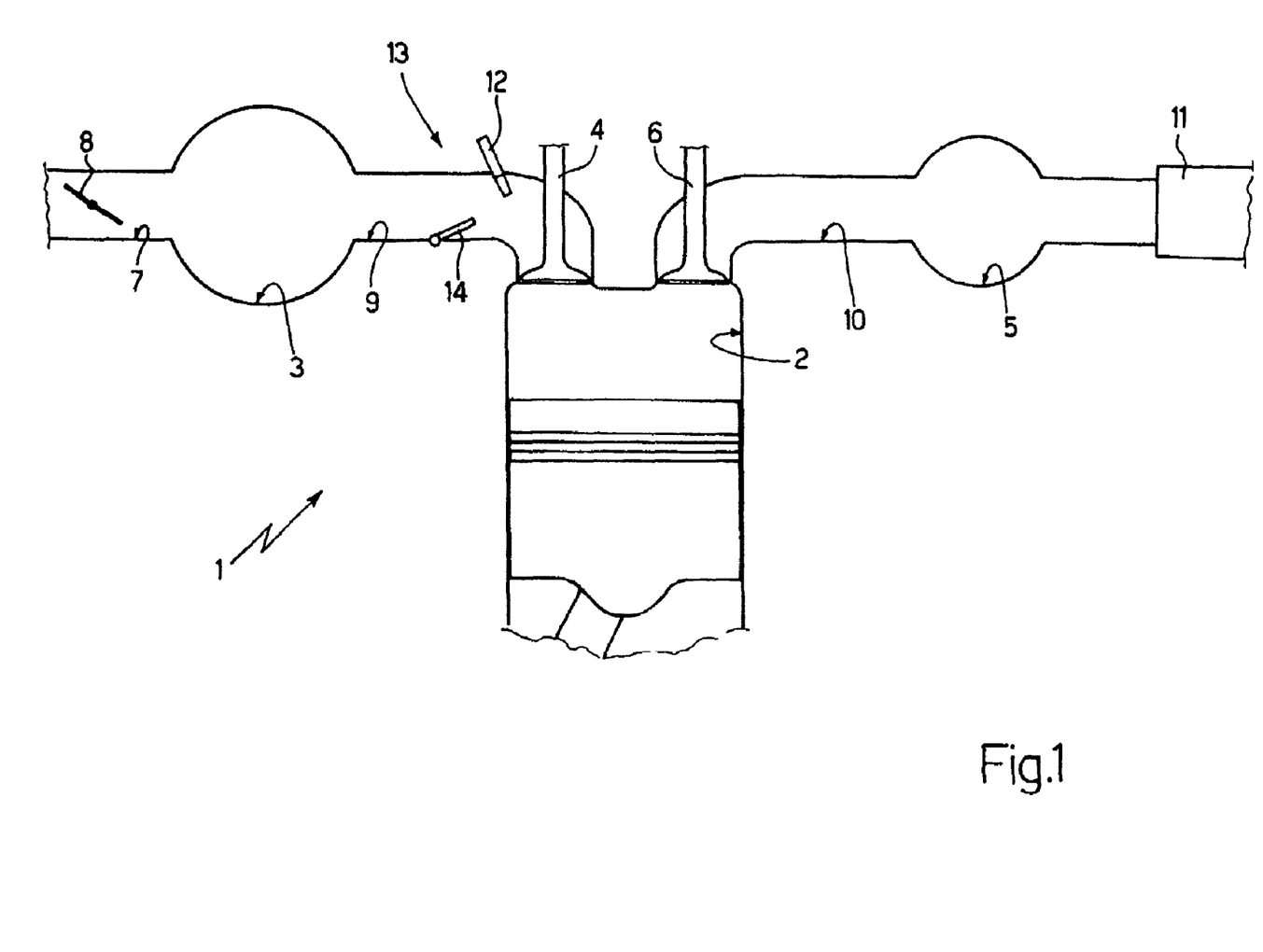
FIG. 1 is a schematic view of an internal-combustion engine provided with an intake manifold having a tumble system made in accordance with an embodiment of the present invention.

In FIG. 1, the reference number 1 designates as a whole an internal-combustion engine provided with four cylinders 2 (only one of which is illustrated in FIG. 1), each of which is connected to an intake manifold 3 via at least one intake valve 4 and to an exhaust manifold 5 via at least one exhaust valve 6.

The intake manifold 3 receives fresh air (i.e., air coming from the external environment) through a supply pipe 7 regulated by a throttle valve 8 and is connected to the cylinders 2 by means of respective intake pipes 9 (only one of which is illustrated in FIG. 1), each of which is regulated by the corresponding intake valve 4. Likewise, the exhaust manifold 5 is connected to the cylinders 2 by means of respective exhaust pipes 10 (only one of which is illustrated in FIG. 1), each of which is regulated by the corresponding exhaust valve 6. Departing from the exhaust manifold 5 is an emission pipe 11, which terminates with a silencer (known and not illustrated) for emitting into the atmosphere the gas produced by the combustion.

According to the embodiment illustrated, the fuel (for example, petrol, diesel, methane, LPG, etc.) is injected into each intake pipe 9 by means of an injector 12 set in the proximity of the corresponding intake valve 4. According to a different embodiment (not illustrated), the injectors 12 are arranged so as to inject the fuel directly into the cylinders 2.

Figure 2:
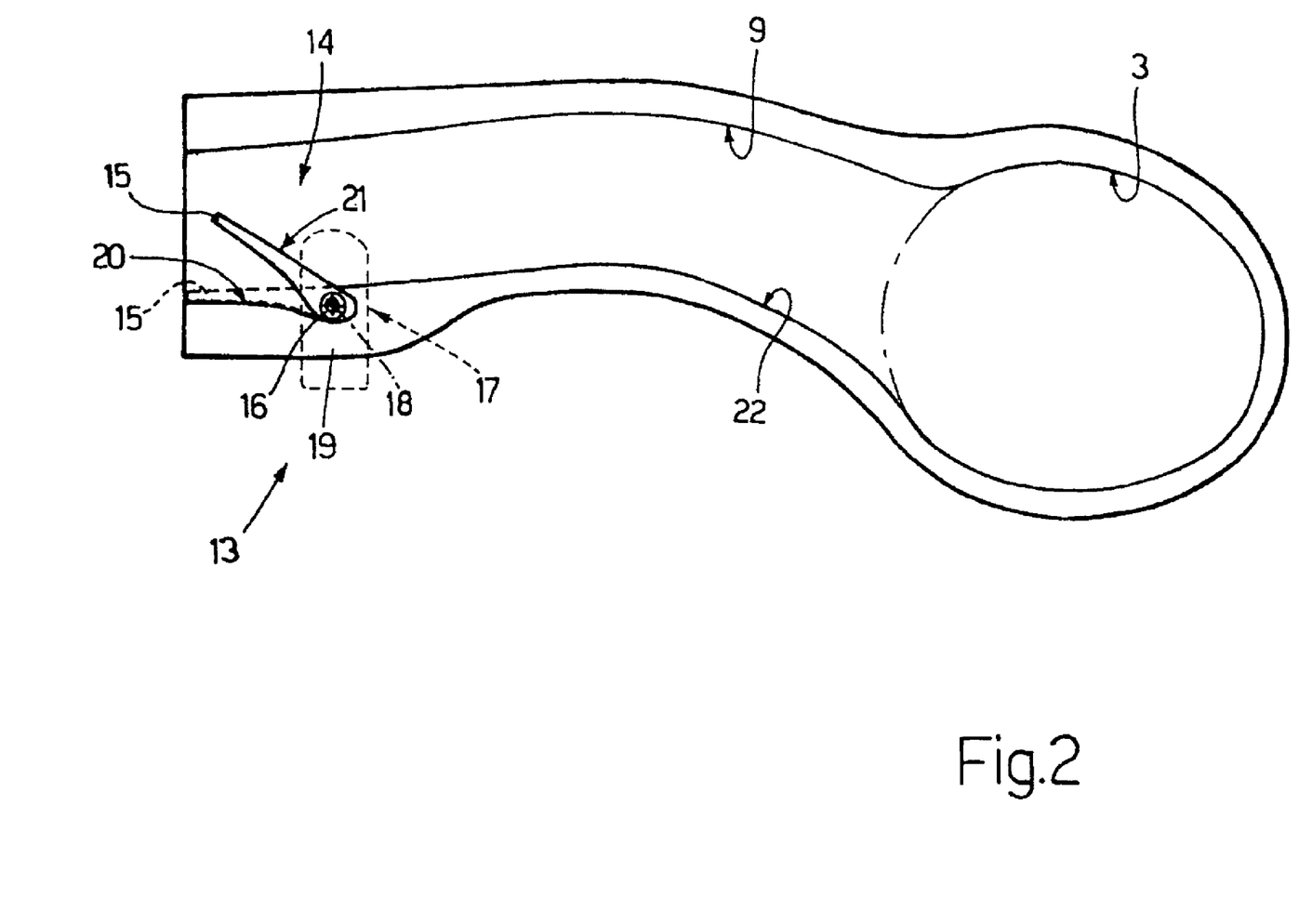
FIG. 2 is a side sectional view, with parts removed for reasons of clarity, of part of the intake manifold of FIG. 1.

The intake manifold 3 comprises a tumble system 13, which is designed to vary the section of the intake pipes 9 as a function of the engine r.p.m. 1. According to what is illustrated in FIG. 2, the tumble system 13 comprises for each intake pipe 9 a throttle valve 14, which has a throttle butterfly 15 fitted on a common shaft 16 so as to rotate under the thrust of an actuator device 17 about an axis 18 set transversely and externally with respect to the corresponding intake pipe 9. It should be emphasized that the shaft 16 is common to all four the throttle valves 14; i.e., the throttle butterflies 15 of the four throttle valves 14 are fitted on a single common shaft 16 in such a way that the actuator device 17 will be able to control simultaneously all four the throttle valves 14.

According to a different embodiment (not illustrated), each throttle valve 14 has an actuator device 17 of its own, which is designed to rotate the respective throttle butterfly 15 irrespective of the other throttle butterflies 15.

In use, each throttle butterfly 15 turns under the thrust of the actuator device 17 between a position of maximum extraction (represented with a solid line in FIG. 2), in which the throttle butterfly 15 reduces to a minimum value the section of passage of the air of the intake pipe 9, and a resting position (illustrated with a dashed line in FIG. 2), in which the throttle butterfly 15 does not bring about any reduction in the section of passage of the air of the intake pipe 9.

For each throttle butterfly 15, the shaft 16 is embedded in a wall 19 of the intake pipe 9 so as to turn about the axis 18 of rotation. Furthermore, the wall 19 of each intake pipe 9 has a seat 20, which is designed to house the throttle butterfly 15 when the throttle butterfly 15 itself is set in the resting position. When the throttle butterfly 15 is set in the resting position, a top surface 21 of the throttle butterfly 15 constitutes a continuation of an internal surface 22 of the intake pipe 9 and is radiused substantially without any discontinuity with the internal surface 22 itself. In particular, in the resting position, the top surface 21 of each throttle butterfly 15 is substantially parallel to the central axis of the intake pipe 9, whilst, in the position of maximum extraction, the top surface 21 of each throttle butterfly 15 forms an angle of approximately 30-45° with the central axis of the intake pipe 9.

Figure 3:
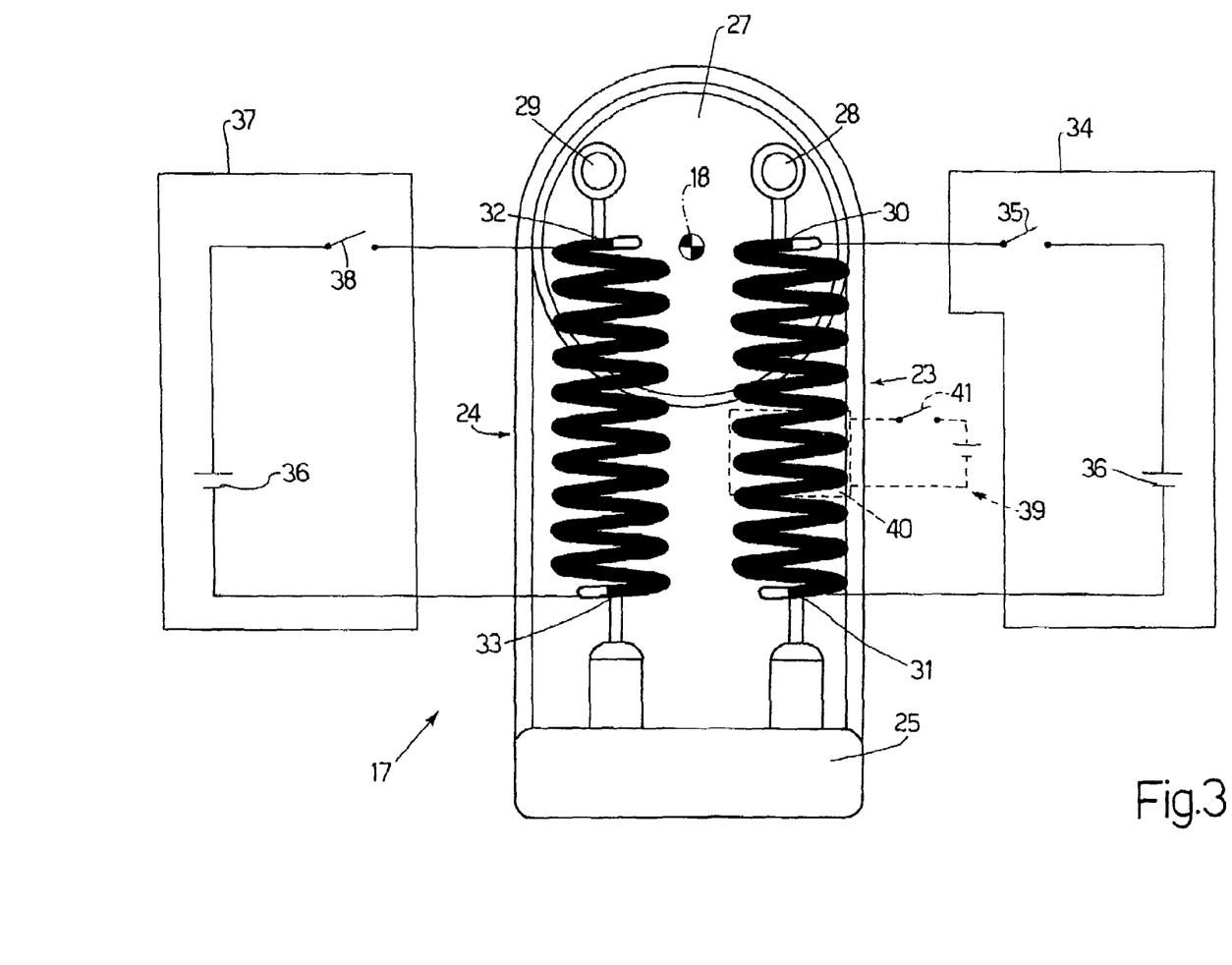
FIG. 3 is a schematic front view of an actuator of the tumble system of FIG. 1.
Figure 4:
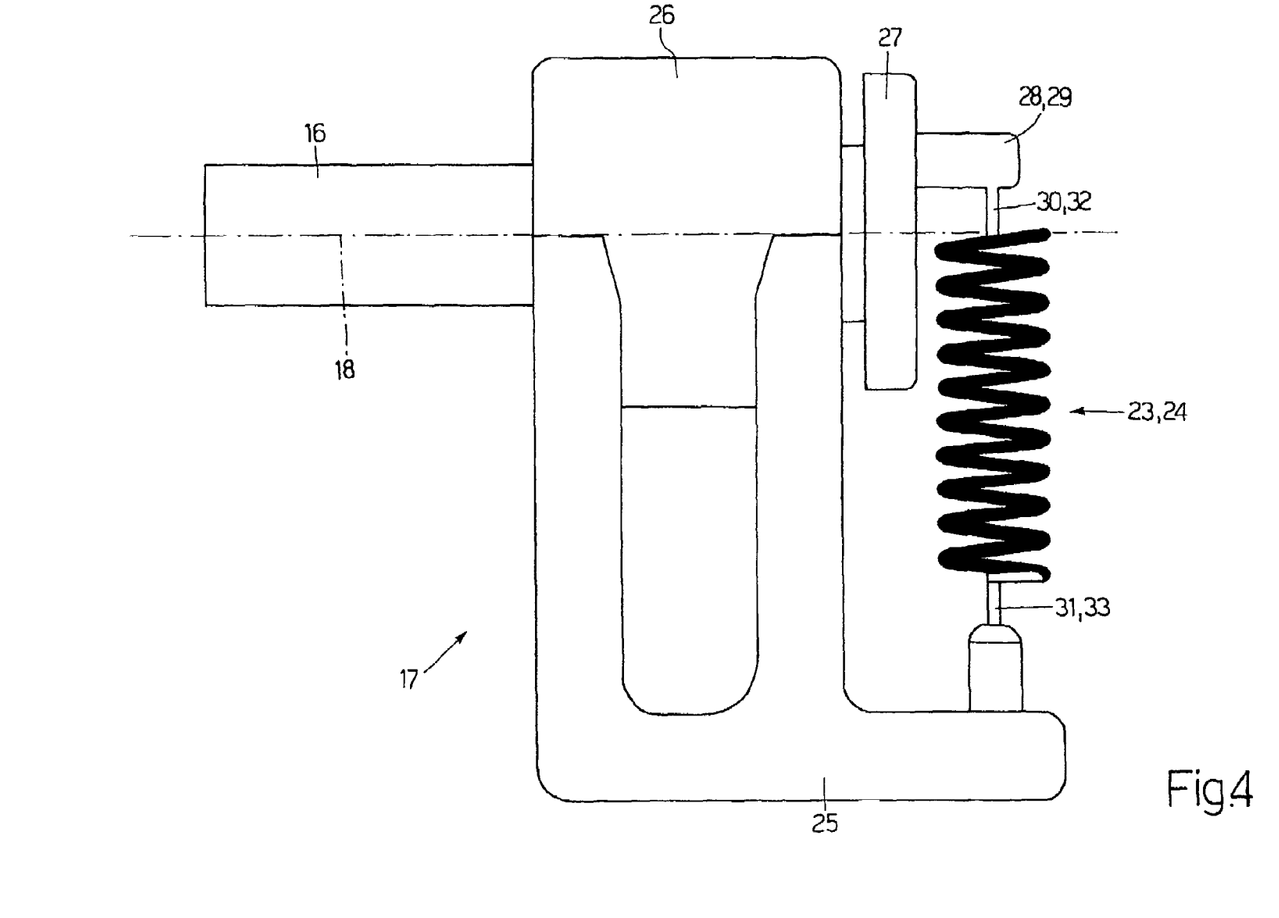
FIG. 4 is a schematic side view of the actuator of FIG. 3.

According to what is illustrated in FIGS. 3 and 4, the torque produced by the actuator device 17 and acting on the shaft 16 is generated by a pair of actuator elements 23 and 24, which are made of a shape-memory material and are energized by heating to modify their own geometry and consequently cause rotation of the shaft 16.

A shape-memory material is a metal alloy capable of modifying its own physical properties following upon application of an external stress which is also of a physical nature. In particular, metal alloys are used (for example, a nickel-titanium alloy or else a copper-based alloy) capable of modifying their own dimensions following upon application of heat. In other words, the variation in geometry of the actuator elements 23 and 24 is obtained by means of heating (i.e., by raising the temperature) of the actuator elements 23 and 24 themselves.

Preferably, each actuator element 23 or 24 is filiform and is wound in a spiral so as to assume the conformation of a spring having two opposite ends. At environmental temperature, each actuator element 23 or 24 has a given length, whereas, when the temperature of the actuator element 23 or 24 exceeds a pre-set temperature threshold (depending upon the chemico-physical characteristics of the material), the actuator element 23 or 24 is shortened by a pre-set amount (depending upon the chemico-physical characteristics of the material) bringing about a reduction in the distance existing between the opposite ends of the actuator element 23 or 24 itself.

According to a first embodiment, each actuator element 23 or 24 is a "one way" element, i.e., it shortens when it is heated but does not lengthen spontaneously to return to its initial dimensions when it is cooled; in this case, an external force must be exerted so as to bring the actuator element 23 or 24 back again into its original configuration. According to an alternative embodiment, each actuator element 23 or 24 is a "two way" element, i.e., it shortens when it is heated and it lengthens spontaneously to return to its initial dimensions when it is cooled.

The actuator device 17 comprises a fixed frame 25 in which a seat 26 is made, which receives the shaft 16 enabling the shaft 16 itself to turn freely about the axis 18 of rotation. Fifted co-axially to one end of the shaft 16 is a disk 27, which is thus fixed to the shaft 16 itself; rising from the disk 27 are two pins 28 and 29, which are set parallel to the axis 18 of rotation, are arranged eccentrically with respect to the axis 18 of rotation, and are set symmetrically on opposite sides of the axis 18 of rotation itself. One end 30 of the actuator element 23 is mechanically connected to the pin 28, whilst the opposite end 31 of the actuator element 23 is mechanically connected to the frame 25. One end 32 of the actuator element 24 is mechanically connected to the pin 29, whilst the opposite end 33 of the actuator element 24 is mechanically connected to the frame 25.

Coupled to the actuator element 23 is an energizing device 34, which is designed to cause heating of the actuator element 23 sufficient to raise the temperature of the actuator element 23 itself above the aforesaid energizing threshold. The energizing device 34 is designed to apply a voltage between the ends 30 and 31 of the actuator element 23 in such a way as to cause passage of an electric current along the actuator element 23 and heat the actuator element 23 itself by the Joule effect. As a whole, the energizing device 34 comprises an electronic member 35 that brings about closing of an electric circuit, which connects the ends 30 and 31 of the actuator element 23 to an electric generator 36.

Likewise, also coupled to the actuator element 24 is an energizing device 37, which is designed to cause a heating of the actuator element 24 that is sufficient to raise the temperature of the actuator element 24 above the aforesaid energizing threshold. The energizing device 37 is designed to apply a voltage between the ends 32 and 33 of the actuator element 24 in such a way as to cause passage of an electric current along the actuator element 24 and heat the actuator element 24 itself by the Joule effect. As a whole, the energizing device 37 comprises an electronic member 38, which brings about closing of an electric circuit, which connects the ends 32 and 33 of the actuator element 24 to the electric generator 36.

According to a possible embodiment, the two actuator elements 23 and 24 are sized in such a way that, in the absence of energizing, i.e., when neither of the two actuator elements 23 and 24 is subjected to heating, no actuator element 23 or 24 prevails over the other actuator element 24 or 23, and hence the shaft 16, i.e., the throttle butterflies 15, are maintained in an intermediate position. In this case, one of the two actuator elements 23 and 24 must always be energized to maintain the shaft 16 in an angular position corresponding to the resting position (illustrated with a dashed line in FIG. 2) of the throttle butterflies 15 or in an angular position corresponding to the position of maximum extraction (illustrated with a solid line in FIG. 2) of the throttle butterflies 15.

According to a different embodiment, the two actuator elements 23 and 24 are sized in such a way that, in the absence of energizing, i.e., when neither of the two actuator elements 23 and 24 is subjected to heating, the actuator element 24 exerts on the disk 27 a torque greater than that of the actuator element 23, and hence the shaft 16 is maintained in an angular position corresponding to the resting position of the throttle butterflies 15.

When the actuator element 23 is energized, i.e., when it is subjected to heating, the actuator element 23 itself shortens, thus bringing about mutual approach of its own ends 30 and 31; said mutual approach of the ends 30 and 31 of the actuator element 23 generates on the disk 27 a torque, which sets the shaft 16 in rotation until the throttle butterflies 15 are brought from the resting position (illustrated with a dashed line in FIG. 2) to the position of maximum extraction (illustrated with a solid line in FIG. 2). When the actuator element 24 is energized, i.e., when it is subjected to heating, the actuator element 24 itself shortens, thus bringing about mutual approach of its own ends 32 and 33; said mutual approach of the ends 32 and 33 of the actuator element 24 generates on the disk 27 a torque that sets the shaft 16 in rotation until the throttle butterflies 15 are brought from the position of maximum extraction (illustrated with a solid line in FIG. 2) to the resting position (illustrated with a dashed line in FIG. 2). Of course, the two actuator elements 23 and 24 must never be energized simultaneously in order to prevent discordant torques from being generated on the disk 27, which could cause mechanical failure.

If the actuator element 23 is a "one way" element, the action of the actuator element 23 is necessary for displacing the throttle butterflies 15 from the resting position to the position of maximum extraction, and the action of the actuator element 24 is necessary for displacing the throttle butterflies 15 from the position of maximum extraction to the resting position.

If the actuator element 23 is a "two way" element, to displace the throttle butterflies 15 from the position of maximum extraction to the resting position, it is sufficient to de-energize the actuator element 23, i.e., interrupt heating. Natural cooling of the actuator element 23 causes a lengthening of the actuator element 23 itself, which generates a torque that sets in rotation the shaft 16 until are the throttle butterflies 15 are brought back again into their resting position. However, in order to increase the speed at which the throttle butterflies 15 displace from the position of maximum extraction to the resting position, it is preferable to de-energize the actuator element 23, i.e., interrupt heating, and simultaneously energize, i.e., subject to heating, the actuator element 24.

By way of example, in order to heat each actuator device 23 or 24 an electric power of approximately 5-10 W is required.

According to a different embodiment (not illustrated), only the actuator element 23 is made of a shape-memory material which is energized by heating, whereas the actuator element 24 is made of ordinary spring steel. Of course, in this case, it is absolutely necessary for the actuator element 23 to be a "two way" element. Said embodiment presents lower production costs than does the embodiment illustrated in FIGS. 3 and 4 (in particular, on account of the absence of the energizing device 37 of the actuator element 24) but, on the other hand, is slower in its displacement from the position of maximum opening to the resting position.

According to a further embodiment (not illustrated), just the actuator element 23 is present. Of course, in this case, it is absolutely necessary for the actuator element 23 to be a "two way" element. Said embodiment presents even lower production costs but, on the other hand, is slower both in its displacement from the resting position to the position of maximum opening and in its displacement from the position of maximum opening to the resting position.

According to an alternative embodiment illustrated with a dashed line in FIG. 3, the energizing device 34 of the actuator element 23 comprises a cooling member 39, which is designed to cause a forced cooling of the actuator element 23. The function of the cooling member 39 can be readily understood and consists in increasing the speed of displacement of the throttle butterflies 15 from the position of maximum opening to the resting position. The cooling member 39 comprises at least one Peltier cell 40 (or a similar thermoelectric module) mounted on the actuator element 23 and an electronic member 41 (typically a transistor), which causes closing of an electric circuit that connects the Peltier cell 40 to the electric generator 36. In use, the Peltier cell 40 is activated by closing the electronic member 41 to bring about a forced, and hence faster, cooling of the actuator element 23. Each Peltier cell 40 is typically connected to a side surface of the actuator element 23 and can be plane or else curved to adapt to the shape of the actuator element 23 itself. Each Peltier cell 40 has a square/round shape having a side/diameter of approximately 20 mm and a thickness of approximately 2-3 mm. During forced cooling, each Peltier cell 40 absorbs an electric power generally of between 10 and 20 W.

According to a variant (not illustrated), also the device 37 for energizing the actuator element 24 comprises a cooling member similar to the cooling member 39.

According to a different embodiment (not illustrated), heating of the actuator element 23 and/or of the actuator element 24 is obtained by means an effect of a magnetic/electromagnetic type (typically via heating by induction), by radiation, or else by exploiting a flow of a liquid or of a gas.

According to an embodiment illustrated in the attached figures, the disk 27 is directly fitted to the shaft 16. According to a different embodiment (not illustrated), the disk 27 transmits the movement to the shaft 16 by interposition of a mechanism that amplifies the movement produced by the actuator elements 23 and 24.

According to the embodiment illustrated in FIGS. 3 and 4, the actuator elements 23 and 24 are extension springs, i.e., they modify their own geometry by shortening when they are energized by heating. According to a different embodiment illustrated in FIGS. 5 and 6, the actuator elements 23 and 24 are compression springs, i.e., they modify their own geometry by lengthening when they are energized by heating.

Figure 5:
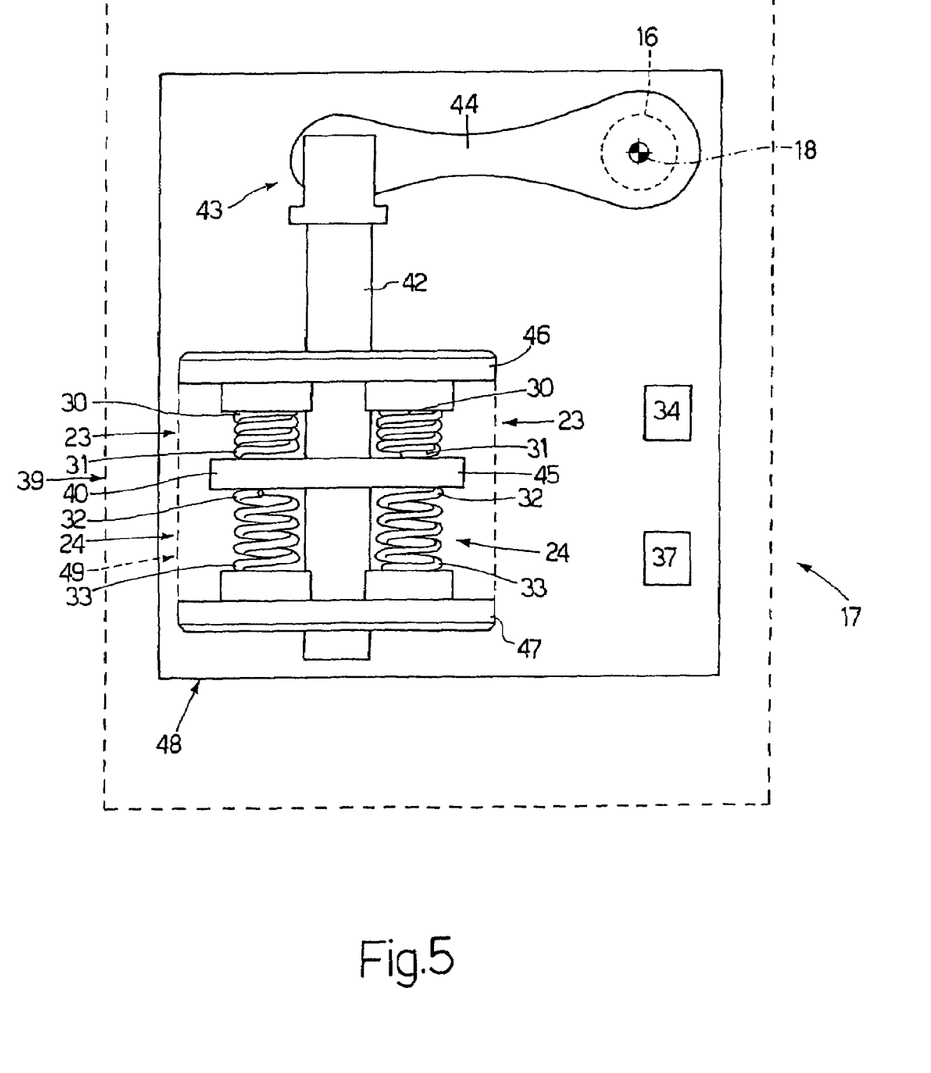
FIG. 5 is a schematic front view of a different embodiment of an actuator of the tumble system of FIG. 1.
Figure 6:
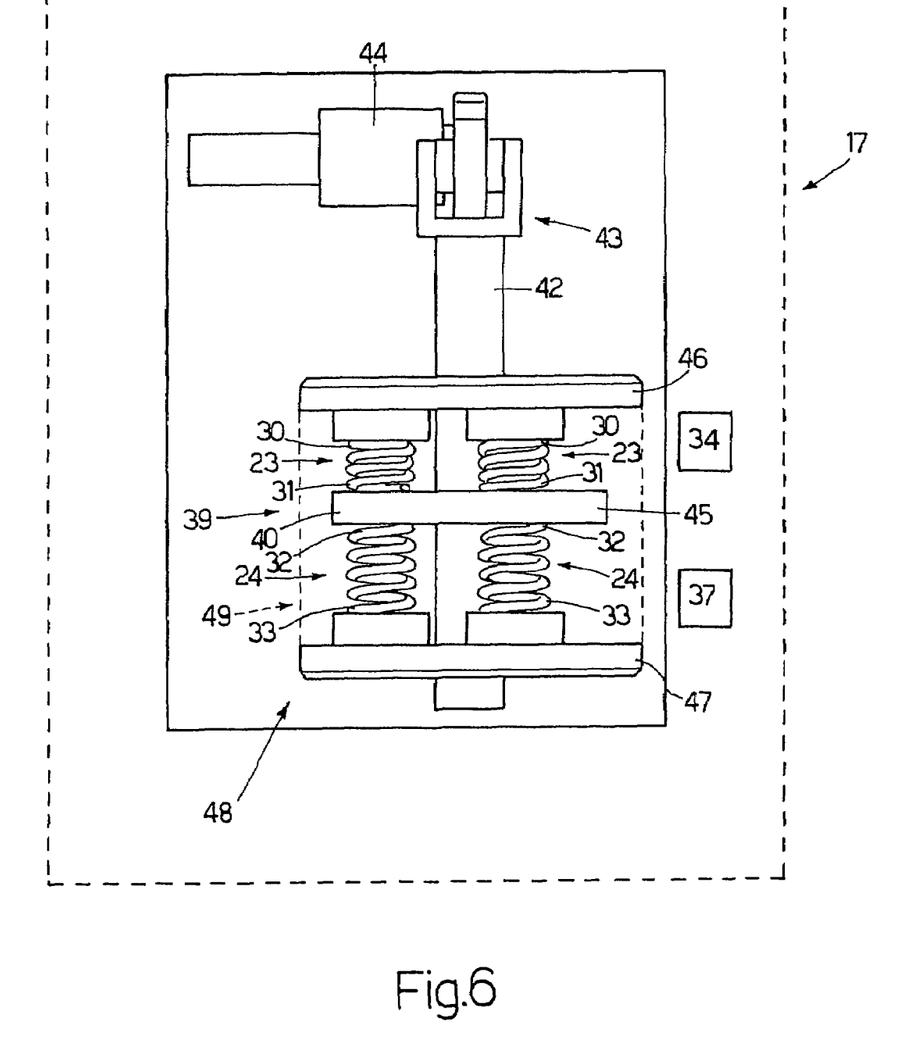
FIG. 6 is a schematic side view of the actuator of FIG. 5.

According to what is illustrated in FIGS. 5 and 6, the actuator device 17 comprises a shaft 42, which is mounted so as to slide axially and has one end 43 mechanically connected to the shaft 16 by interposition of a connection rod 44 in such a way that the axial sliding of the shaft 42 brings about a corresponding rotation of the shaft 16 about the axis 18 of rotation. Fitted to the shaft 42 is a central disk 45 set between two end disks 46 and 47, each of which is mounted in a fixed position and has a central hole (not illustrated in detail) through which the shaft 42 slides freely. In other words, the shaft 42 slides freely within the end disks 46 and 47 which remain in a fixed position, whilst the central disk 45 is displaced fixedly with the shaft 42 consequently varying its own position with respect to the end disks 46 and 47.

Preferably, the two end disks 46 and 47 constitute the two opposite bases of a cylindrical body 48 which is hollow so as to house inside it the central disk 45 and part of the shaft 42. The side surface 49 and/or the end disks 46 and 47 of the cylindrical body 48 can be thermally insulated (i.e., provided with a layer of thermally insulating material) to minimize transmission of heat from the outside to the inside.

Set between the end disk 46 and the central disk 45 are three actuator elements 23 (only two of which are illustrated in FIGS. 5 and 6), which are symmetrically distributed around the shaft 42. Likewise, set between the end disk 47 and the central disk 45 are three actuator elements 24 (just two of which are illustrated in FIGS. 5 and 6), which are symmetrically distributed around the shaft 42. It is clear that the number of actuator elements 23 and 24 can be modified according to the intensity of the torque necessary and generally can range from two to five.

Operation of the actuator device 17 illustrated in FIGS. 5 and 6 is similar to that of the actuator device 17 illustrated in FIGS. 3 and 4. When the actuator elements 23 are energized, i.e., when they are subjected to heating according to the modalities described above, the actuator elements 23 lengthen bringing about a mutual recession of their own ends 30 and 31; said mutual recession of the ends 30 and 31 of the actuator elements 23 brings about a recession of the central disk 45 with respect to the end disk 46 with a consequent axial displacement of the shaft 42, which sets the shaft 16 in rotation until the throttle butterflies 15 are brought from the resting position (illustrated with a dashed line in FIG. 2) to the position of maximum extraction (illustrated with a solid line in FIG. 2). When the actuator elements 24 are energized, i.e., when they are subjected to heating according to the modalities described above, the actuator elements 24 lengthen, bringing about a mutual recession of their own ends 32 and 33; said mutual recession of the ends 32 and 33 of the actuator elements 24 brings about a recession of the central disk 45 with respect to the end disk 47 with a consequent axial displacement of the shaft 42, which sets in rotation the shaft 16 until the throttle butterflies 15 are brought from the position of maximum extraction (illustrated with a solid line in FIG. 2) to the resting position (illustrated with a dashed line in FIG. 2). Obviously, the actuator elements 23 and 24 must never be energized simultaneously in order to prevent generation on the central disk 45 of opposite forces, which could cause mechanical failure.

According to a preferred embodiment, a cooling member 39 is provided, which is designed to bring about a forced cooling of the actuator elements 23 and of the actuator elements 24. The cooling member 39 comprises at least one Peltier cell 40 (or a similar thermoelectric module), which is inserted into the central disk 45 or, alternatively, defines the central disk 45. In use, the Peltier cell 40 is activated with a given voltage to transfer heat from the actuator elements 23 to the actuator elements 24, or else is activated with a voltage of an opposite sign to transfer heat from the actuator elements 24 to the actuator elements 23. In this way, a single Peltier cell 40 is able to bring about both heating/cooling of the actuator elements 23 and simultaneous cooling/heating of the actuator elements 24.

The solution of embodiment described above presents numerous advantages, in so far as is simple and economically advantageous to produce and enables, as compared to a traditional electrical or pneumatic embodiment, a reduction in weight of approximately 80% to be obtained, as well as a considerable reduction in the overall dimensions, and a higher reliability. Furthermore, the actuator 17 described above provides a system which presents a high level of integration and is simple from the constructional standpoint. Finally, experimental tests have highlighted the fact that the actuator device 17 described above presents requirements in terms of power and of energy consumption that are extremely contained and markedly lower as compared to a traditional embodiment with electric motor. In particular, the actuator device 17 described above may require in use a power of 5-10 W as against a power requirement of a traditional actuator device of above 40 W.

From the foregoing it will be appreciated that, although specific embodiments of the invention have been described herein for purposes of illustration, various modifications may be made without deviating from the spirit and scope of the invention.

The invention claimed is:

1. A tumble system for an intake manifold of an internal-combustion engine provided with a number of cylinders; the tumble system comprising:

at least one throttle valve for varying the section of passage of the air through an intake pipe, which connects at least one cylinder with the intake manifold, and at least one actuator device for governing the throttle valve; wherein the actuator device comprises:

at least one first actuator element, which is filiform, is wound in a spiral so as to assume the conformation of a spring, and is made of a shape-memory material that generates a displacement of activation of the throttle valve by modifying its own geometry following upon application of an external stress of a physical nature;

at least one second actuator element, which is filiform, is wound in a spiral so as to assume the conformation of a spring, and is made of a shape-memory material that generates a displacement of activation of the throttle valve by modifying its own geometry following upon application of an external stress of a physical nature; and electric activating means for applying an external stress of a physical nature to the actuator elements;

wherein the actuator elements are sized in such a way that, in the absence of external energizing, an actuator element prevails over the other actuator element.

2. The tumble system according to claim 1, in which each actuator element is wound in a spiral so as to assume the conformation of a compression spring.

3. The tumble system according to claim 1, in which each actuator element is wound in a spiral so as to assume the conformation of a extension spring.

4. The tumble system according to claim 1, in which each actuator element is wound in a spiral so as to assume the conformation of a one-way spring.

5. The tumble system according to claim 1, in which each actuator element is wound in a spiral so as to assume the conformation of a two-way spring.

6. The tumble system according to claim 1, in which each actuator element modifies its own geometry following upon application of heat.

7. The tumble system according to claim 6, in which each actuator element is heated by the Joule effect, causing circulation of an electric current through the actuator element itself.

8. The tumble system according to claim 6, in which: the actuator device comprises heating means for heating the actuator elements and cooling means for cooling the actuator elements; and the actuator device is designed to heat the first actuator element and simultaneously cool the second actuator element, and vice versa.

9. The tumble system according to claim 8, in which the heating means are designed to cause heating of an actuator element via application of a voltage between the ends of the actuator element in such a way as to bring about passage of an electric current through the actuator element and heat the actuator element itself by the Joule effect.

10. The tumble system according to claim 8, in which the cooling means comprise a Peltier cell.

11. The tumble system according to claim 1, in which: the actuator device comprises a shaft mounted so as to slide axially, a central disk fixed to the shaft, and two end disks, which are arranged on opposite sides of the central disk, are mounted in a fixed position and have respective central holes through which the shaft slides freely; set between a first end disk and the central disk is a number of actuator elements symmetrically distributed around the shaft; and set between a second end disk and the central disk is a number of actuator elements symmetrically distributed around the shaft.

12. The tumble system according to claim 11, in which the two end disks constitute the two opposite bases of a cylindrical body, which is hollow so as to house inside it the central disk and part of the shaft.

13. The tumble system according to claim 12, in which the side surface and/or the end disks of the cylindrical body are thermally insulated.

14. The tumble system according to claim 11, in which the actuator device comprises a cooling means, which are designed to cause a forced cooling of the actuator elements and is integrated in the central disk.

15. The tumble system according to claim 14, in which the cooling means comprise at least one Peltier cell inserted into the central disk.

16. The tumble system according to claim 14, in which the cooling means comprise at least one Peltier cell, which defines the central disk.

17. The tumble system according to claim 1, in which: the actuator device comprises a fixed frame, and a disk, which is mounted so that it can turn on the fixed frame so as to rotate about an axis of rotation and is mechanically connected to the throttle valve; rising from the disk are two pins, which are set parallel to the axis of rotation, are arranged eccentrically with respect to the axis of rotation, and are set symmetrically on opposite sides of the axis of rotation itself; a first end of the first actuator element is mechanically connected to a first pin, and a second end of the first actuator element is mechanically connected to the fixed frame; and a first end of the second actuator element is mechanically connected to a second pin, and a second end of the second actuator element is mechanically connected to the fixed frame.

18. The tumble system according to claim 1, in which the throttle valve comprises a throttle butterfly mounted on a shaft so as to rotate under the thrust of the actuator device about an axis of rotation; the first actuator element generates a torque by modifying its own geometry following upon application of an external stress of a physical nature on the first actuator element itself.

19. The tumble system according to claim 18, in which the first actuator element generates a torque by modifying its own geometry following upon application of heat on the first actuator element itself.

20. The tumble system according to claim 19, in which the first actuator element is heated by the Joule effect, causing the first actuator element itself to be traversed by an electric current.

21. The tumble system according to claim 19, in which: the first actuator element is designed to generate a torque for displacing the throttle butterfly from a resting position to a position of maximum extraction; and the actuator device comprises at least one second actuator element designed to generate a torque for displacing the throttle butterfly from the position of maximum extraction to the resting position.

22. The tumble system according to claim 21, in which the two actuator elements are sized in such a way that, in the absence of energizing, the second actuator element exerts a torque greater than that exerted by the first actuator element, and the throttle butterfly is thus set in the resting position.

23. The tumble system according to claim 21, in which the second actuator element is made of a shape-memory material and generates a displacement by modifying its own geometry following upon application of heat on the second actuator element itself.

24. The tumble system according to claim 23, in which each actuator element is filiform and is wound in a spiral so as to assume the conformation of a spring.

25. The tumble system according to claim 23, in which: the actuator device comprises a fixed frame and a disk, which is mounted so that it can turn on the fixed frame and is mechanically connected to the shaft of the throttle butterfly; rising from the disk are two pins, which are set parallel to the axis of rotation, are arranged eccentrically with respect to the axis of rotation, and are set symmetrically on opposite sides of the axis of rotation itself; a first end of the first actuator element is mechanically connected to a first pin, and a second end of the first actuator element is mechanically connected to the fixed frame; and a first end of the second actuator element is mechanically connected to a second pin, and a second end of the second actuator element is mechanically connected to the fixed frame.

26. The tumble system according to claim 23, in which the actuator device comprises a pair of energizing devices, each of which is designed to cause heating of a respective actuator element via application of a voltage between the ends of the actuator element in such a way as to cause passage of an electric current through the actuator element and heat the actuator element itself by the Joule effect.

27. The tumble system according to claim 23, in which the actuator device comprises at least one first cooling member, which is designed to cause a forced cooling of the first actuator element.

28. The tumble system according to claim 27, in which the cooling member comprises at least one Peltier cell mounted on the first actuator element.

29. The tumble system according to claim 23, in which the actuator device comprises a second cooling member, which is designed to cause a forced cooling of the second actuator element.

30. The tumble system according to claim 1, in which: the throttle valve comprises a throttle butterfly mounted on a shaft so as to rotate under the thrust of the actuator device about an axis of rotation; and the axis of rotation of the throttle butterfly is set substantially on the outside with respect to the intake pipe in such a way that, in a resting position, the throttle butterfly does not bring about any reduction in the section of passage of the air of the intake pipe.

31. The tumble system according to claim 30, in which: the intake pipe has a wall delimiting the section of passage of the air; and the throttle butterfly is mounted on a respective shaft embedded in the wall of the respective intake pipe.

32. The tumble system according to claim 31, in which the wall of the intake pipe has a seat, which is designed to house the throttle butterfly when the throttle butterfly itself is set in a resting position.

33. A tumble system for an intake manifold of an internal-combustion engine provided with a number of cylinders; the tumble system comprising:

at least one throttle valve for varying the section of passage of the air through an intake pipe, which connects at least one cylinder with the intake manifold, and at least one actuator device for governing the throttle valve;

wherein the actuator device comprises:

at least one first actuator element, which is filiform, is wound in a spiral so as to assume the conformation of a spring, and is made of a shape-memory material that generates a displacement of activation of the throttle valve by modifying its own geometry following upon application of an external stress of a physical nature;

at least one second actuator element, which is filiform, is wound in a spiral so as to assume the conformation of a spring, and is made of a shape-memory material that generates a displacement of de-activation of the throttle valve by modifying its own geometry following upon application of an external stress of a physical nature; and electric activating means for applying an external stress of a physical nature to the actuator elements;

wherein each actuator element modifies its own geometry following upon application of heat and the actuator device comprises heating means for heating the actuator elements and cooling means for cooling the actuator elements; and wherein the actuator device is designed to heat the first actuator element and simultaneously cool the second actuator element, and vice versa.

34. The tumble system according to claim 33, wherein the heating means are designed to cause heating of an actuator element via application of a voltage between the ends of the actuator element in such a way as to bring about passage of an electric current through the actuator element and heat the actuator element itself by the Joule effect.

35. The tumble system according to claim 33, wherein the cooling means comprise a Peltier cell.

36. A tumble system for an intake manifold of an internal-combustion engine provided with a number of cylinders; the tumble system comprising:

at least one throttle valve for varying the section of passage of the air through an intake pipe, which connects at least one cylinder with the intake manifold, and at least one actuator device for governing the throttle valve;

wherein the actuator device comprises:

at least one first actuator element, which is filiform, is wound in a spiral so as to assume the conformation of a spring, and is made of a shape-memory material that generates a displacement of activation of the throttle valve by modifying its own geometry following upon application of an external stress of a physical nature;

at least one second actuator element, which is filiform, is wound in a spiral so as to assume the conformation of a spring, and is made of a shape-memory material that generates a displacement of de-activation of the throttle valve by modifying its own geometry following upon application of an external stress of a physical nature; and electric activating means for applying an external stress of a physical nature to the actuator elements;

wherein the actuator device comprises a fixed frame, and a disk, which is mounted so that it can turn on the fixed frame so as to rotate about an axis of rotation and is mechanically connected to the throttle valve;

wherein rising from the disk are two pins, which are set parallel to the axis of rotation, are arranged eccentrically with respect to the axis of rotation, and are set symmetrically on opposite sides of the axis of rotation itself;

wherein a first end of the first actuator element is mechanically connected to a first pin, and a second end of the first actuator element is mechanically connected to the fixed frame; and wherein a first end of the second actuator element is mechanically connected to a second pin, and a second end of the second actuator element is mechanically connected to the fixed frame.

37. A tumble system for an intake manifold of an internal-combustion engine provided with a number of cylinders; the tumble system comprising:

at least one throttle valve for varying the section of passage of the air through an intake pipe, which connects at least one cylinder with the intake manifold, and at least one actuator device for governing the throttle valve;

wherein the actuator device comprises:

at least one first actuator element, which is filiform, is wound in a spiral so as to assume the conformation of a spring, and is made of a shape-memory material that generates a displacement of activation of the throttle valve by modifying its own geometry following upon application of an external stress of a physical nature;

at least one second actuator element, which is filiform, is wound in a spiral so as to assume the conformation of a spring, and is made of a shape-memory material that generates a displacement of de-activation of the throttle valve by modifying its own geometry following upon application of an external stress of a physical nature; and electric activating means for applying an external stress of a physical nature to the actuator elements;

wherein the throttle valve comprises a throttle butterfly mounted on a shaft so as to rotate under the thrust of the actuator device about an axis of rotation; the first actuator element generates a torque by modifying its own geometry following upon application of an external stress of a physical nature on the first actuator element itself;

wherein the first actuator element generates a torque by modifying its own geometry following upon application of heat on the first actuator element itself;

wherein the first actuator element is designed to generate a torque for displacing the throttle butterfly from a resting position to a position of maximum extraction; and the actuator device comprises at least one second actuator element designed to generate a torque for displacing the throttle butterfly from the position of maximum extraction to the resting position; and wherein the two actuator elements are sized in such a way that, in the absence of energizing, the second actuator element exerts a torque greater than that exerted by the first actuator element, and the throttle butterfly is thus set in the resting position.

38. The tumble system according to claim 37, wherein the second actuator element is made of a shape-memory material and generates a displacement by modifying its own geometry following upon application of heat on the second actuator element itself.

39. The tumble system according to claim 38, wherein each actuator element is filiform and is wound in a spiral so as to assume the conformation of a spring.

40. The tumble system according to claim 38, wherein:
the actuator device comprises a fixed frame and a disk, which is mounted so that it can turn on the fixed frame and is mechanically connected to the shaft of the throttle butterfly;
rising from the disk are two pins, which are set parallel to the axis of rotation, are arranged eccentrically with respect to the axis of rotation, and are set symmetrically on opposite sides of the axis of rotation itself;
a first end of the first actuator element is mechanically connected to a first pin, and a second end of the first actuator element is mechanically connected to the fixed frame; and
a first end of the second actuator element is mechanically connected to a second pin, and a second end of the second actuator element is mechanically connected to the fixed frame.

41. The tumble system according to claim 38, wherein the actuator device comprises a pair of energizing devices, each of which is designed to cause heating of a respective actuator element via application of a voltage between the ends of the actuator element in such a way as to cause passage of an electric current through the actuator element and heat the actuator element itself by the Joule effect.

42. The tumble system according to claim 38, wherein the actuator device comprises at least one first cooling member, which is designed to cause a forced cooling of the first actuator element.

43. The tumble system according to claim 42, wherein the cooling member comprises at least one Peltier cell mounted on the first actuator element.

44. The tumble system according to claim 38 wherein the actuator device comprises a second cooling member, which is designed to cause a forced cooling of the second actuator element.

* * * * *

UNITED STATES PATENT AND TRADEMARK OFFICE
CERTIFICATE OF CORRECTION

| | |
|---|---|
| PATENT NO. | : 7,823,558 B2 |
| APPLICATION NO. | : 11/432726 |
| DATED | : November 2, 2010 |
| INVENTOR(S) | : Nazario Bellato et al. |

It is certified that error appears in the above-identified patent and that said Letters Patent is hereby corrected as shown below:

- In Claim 1, Column 8, Line 16 of the patent, "generates a displacement of activation of the throttle" should read --generates a displacement of de-activation of the throttle--

Signed and Sealed this
Nineteenth Day of April, 2011

David J. Kappos
*Director of the United States Patent and Trademark Office*